Figure 3:
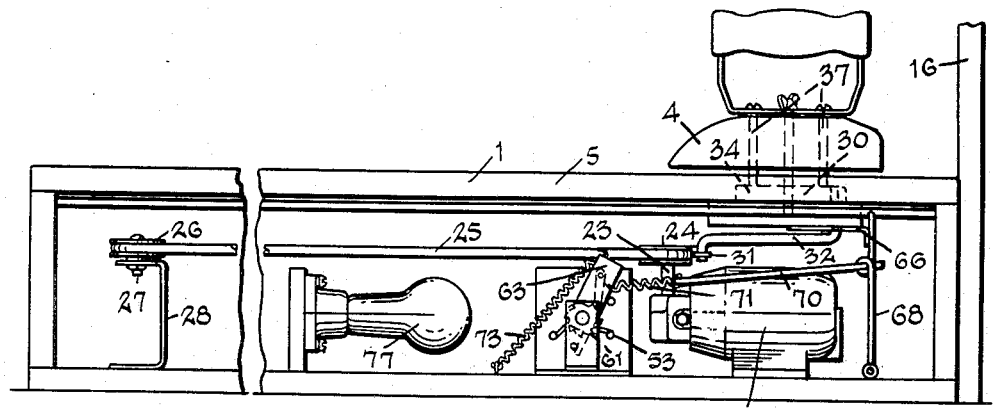

July 17, 1934.  C. W. HUFF  1,966,668
ADVERTISING DEVICE
Filed Dec. 30, 1932   2 Sheets-Sheet 1
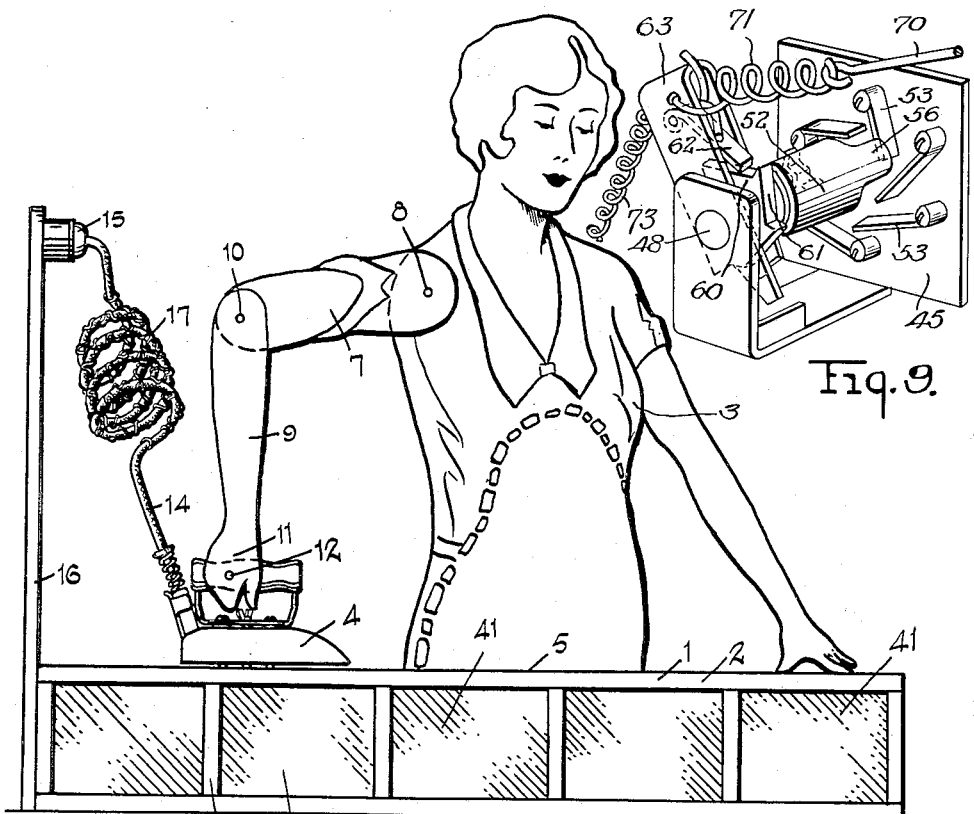
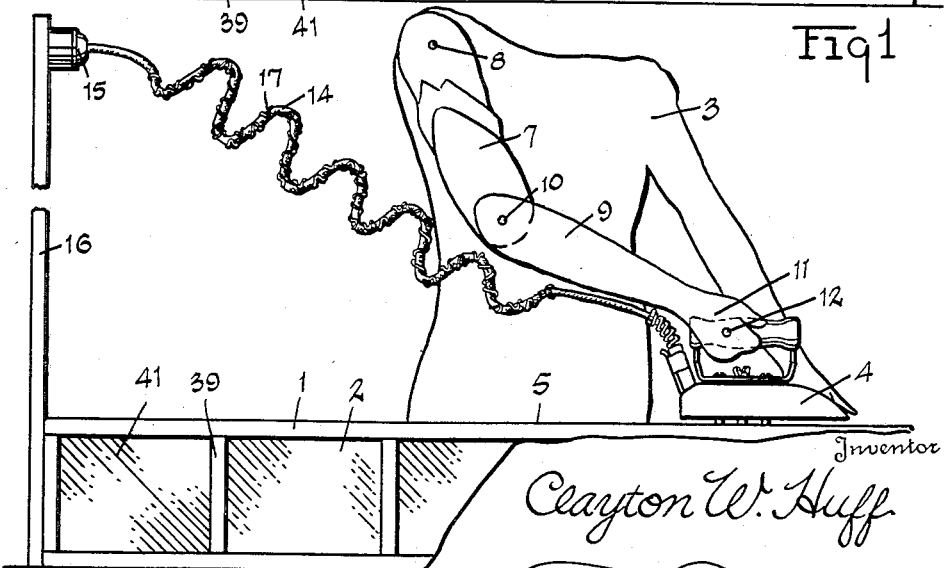

July 17, 1934.    C. W. HUFF    1,966,668
ADVERTISING DEVICE
Filed Dec. 30, 1932    2 Sheets-Sheet 2

Inventor
Clayton W. Huff
By Faust F. Crampton
Attorney

Patented July 17, 1934

1,966,668

UNITED STATES PATENT OFFICE 1,966,668

ADVERTISING DEVICE

Clayton W. Huff, Toledo, Ohio

Application December 30, 1932, Serial No. 649,586

6 Claims. (Cl. 40—126)

My invention relates to a display device particularly adaptable to a method of advertising, which method involves the simulation of an actual use of the article advertised by displayment. The device may be used to display for advertising purposes such articles whose movement in actual use may be closely approximated by the application of reciprocating motion.

The invention has for its object the provision of a mechanically actuated figure in representation of a user of the advertised article, whose movements illustrate the movements involved in the actual use of the article and illuminating, in turn, a series of lettered or pictured plates relating to said article.

Another object of the invention is to provide a device for the presentation of an article for display purposes whose actual adaptability to use and subsequent worth might not otherwise be apparent to the casual observer, except that it be seen applied to the task for which it was designed and its function under actual operation be observed.

A still further object of the invention is to provide a means for the presentation, for display purposes, of appliances, the mere display of which would otherwise fail to demonstrate the simplicity of their application to use or to demonstrate the salient points of advantage to be gained through the acquisition of the article in question and its subsequent use.

The invention also provides a device which, during the mechanical simulation of an actual use of the advertised article, shall display in proper sequence, a number of signs or plates depicting other possible uses to which the advertised article may advantageously be put, or descriptions of the qualities of the article which make it desirable.

Thus, the displayment of an article may be made to lead to the purchase of a number of the articles to be used for as many purposes.

The invention consists in other features and advantages which will appear from the following description and upon examination of the drawings. Structures containing the invention may partake of different forms and may be varied in their details and still embody the invention. To illustrate a practical application of the invention I have selected an advertising device embodying the invention as an example of the various structures and details thereof that may contain the invention and shall describe the selected structure hereinafter, it being understood that variations may be made without departing from the spirit of the invention. The particular structure selected is shown in the accompanying drawings.

Figure 4:
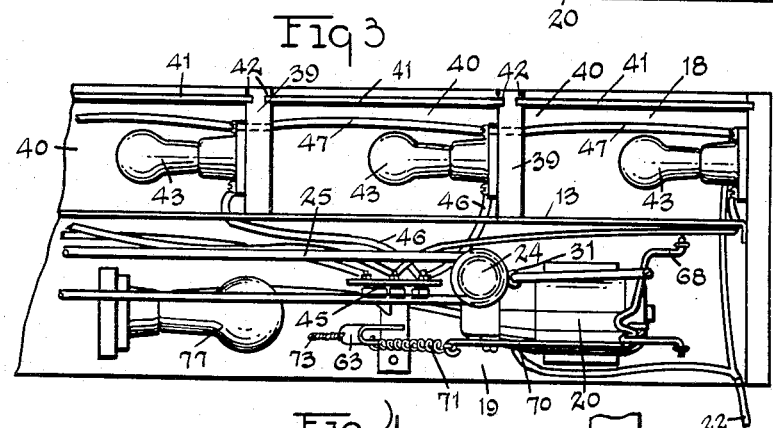
Figures 5, 6, 7:
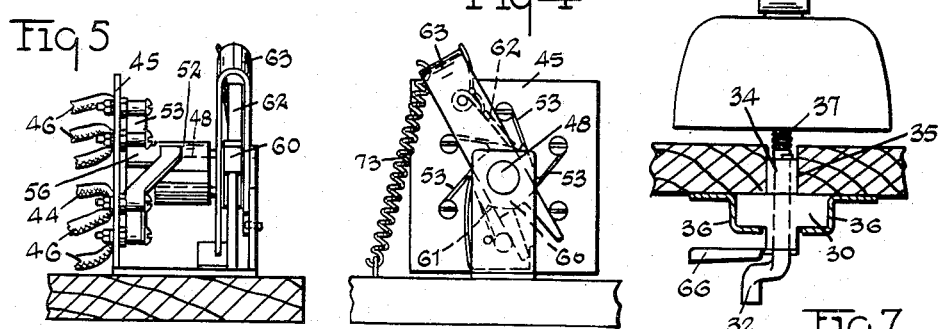
Figure 8:
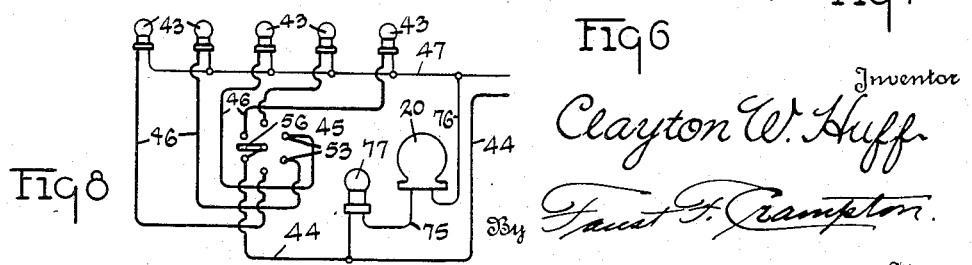

Fig. 1 of the drawings illustrates a perspective view of the particular device chosen for purposes of illustration. Fig. 2 illustrates a broken view of the device illustrated in Fig. 1 and shown in another position in its action. Fig. 3 illustrates an enlarged broken rear view of the actuating mechanism of the device. Fig. 4 illustrates an enlarged plan view of the device with the top removed, parts being shown broken away. Fig. 5 illustrates an enlarged broken section showing a view of the automatically operated switching apparatus by means of which the display signs are shown in sequence. Fig. 6 illustrates a view of a section showing the switching apparatus illustrated in Fig. 5. Fig. 7 illustrates an enlarged view of a broken profile of the electric iron. Fig. 8 illustrates diagrammatically the electrical circuits of the device. Fig. 9 illustrates a perspective view of the switch 45 chosen for purposes of illustration in connection with the invention described herein.

Many articles by prospective purchasers, if merely named and described, or if displayed by themselves, ordinarily fail to attract the attention of a casual observer. The nature of such articles, together with their usual simple and economical design tends to render them meaningless when not observed in their proper setting and performing their appointed tasks. When, however, an article is seen in actual use, and employed at its appointed task, the prospective purchaser often grasps immediately the great advantage to be gained through acquisition of the article. Thus, having attracted the attention of the casual observer by a presentation of such an article, as applied to a particular use, certain other adaptations of the article to different uses may be presented in a striking manner by the successive illuminaton of a number of suitably prepared translucent plates, whose messages are visible only when illuminated. In this manner, the arrested thought of a casual observer may be brought to a realization of the advisability of making several purchases of the displayed article to be used for as many purposes.

In the apparatus used for purposes of illustration, I have represented a particular embodiment of my invention which is designed to present for purposes of advertising, an auxiliary device which is applicable to the use of an electrically heated iron, such as may be found in the average home.

An electrically heated iron commonly derives its power from a wall socket connection with a power circuit by means of an extension cord and unless provision is made for the orderly disposition or retrievement of the slack of the cord, there may develop an annoying and sometimes disastrous entanglement of the extension cord with subsequent interference with the operation of the iron.

Many other electrical appliances in use and on the market which are powered by means of extension cords embody no means for the disposition of slack wire, for which a simple, easily applied, and economical device capable of such disposition would be welcomed by all to whom its function could be understandably presented.

Thus, the hereinafter detailed embodiment of my invention presents a simulation of the actual use of an electric iron to whose extension cord is applied the device designed to dispose of its slack. Simultaneously with this presentation, may be flashed in succession, picturizations of still other electrical appliances having extension cords and having the advertised device similarly applied. It will be noted that the iron was selected for presentation by simulation of its operation, because of the motion involved in its use, it being a well known fact that an object in motion relative to its background will attract attention, whereas the same object at rest relative to the same background may escape attention.

In the device chosen, a cabinet 1 is provided having a face 2 which is normally presented for view to the observer. A figure 3, representing a woman, is attached to the cabinet and projects vertically therefrom. The figure is positioned so as to represent it in the act of operating a simulated electric iron 4, across the top 5 of the cabinet, which serves as an ironing board. The figure 3 may be formed of cardboard, or other similar material suitably configured and colored to present a pleasing appearance. An arm 7 of the figure 3 may be pivoted on the figure, as at the shoulder, by a pin 8. The forearm of the figure may be simulated by a second arm 9 pivotally connected to the arm 7 by a pin 10, and the simulated hand 11 of the figure pivotally connected to the handle of the iron 4 by a pin 12. An extension cord 14 connects the iron with a simulated wall plug 15 which may be mounted on a support 16.

The particular article chosen and presented for advertising purposes, is a helically formed spring wire device 17, designed to support and retrieve the slack of the extension cord 14.

A partition 13 in the cabinet 1 divides the cabinet into a front compartment 18 and a rear compartment 19. An electric motor 20 may be located in the compartment 19 and connected to a suitable source of energy by an extension cord 22. The motor 20 drives a rotatable shaft 23, on which a sheave 24 is keyed. The sheave 24 is adapted to propel a cable 25 in a plane substantially parallel with the top 5 of the cabinet and about a grooved idler pulley 26 which is supported on a shaft 27 by a floor bracket 28. The cable 25 is pivotally joined to a block 30 by means of a suitable cable clasp 31 and a link 32. The block 30 is slidably supported against the under side of the top 5 by a pair of guide bars 36 and has a tongue 34 which is adapted to guide the block along a longitudinal slot 35, formed in the top 5 of the cabinet.

The simulated iron 4 may be supported slightly above the top 5 of the cabinet 30 by means of vertical rods 37 which are fixedly attached to the tongue 34 of the block and which pass upward through the slot 35 and are threadedly attached to the iron 4.

The simulated electric iron is thus slidably supported above the top 5 of the cabinet by the block 30 and is caused to be reciprocated along the line of the slot 35 by the link 32 and the cable 25 driven by the electric motor 12, giving the appearance to an observer of an ironing operation being conducted by the figure 3.

If desired the front compartment 18 of the cabinet may be subdivided by a plurality of vertical partitions 39 into a plurality of compartments 40, each of which has a removable translucent front wall plate 41 slidably supported in slots 42. The translucent wall plates 41 may have represented upon their rear faces inscriptions or pictures relative to the article presented and its further adaptability to uses other than to the particular use which was chosen for simulation.

For the purpose of showing the inscriptions or pictures on the plates 41, an electric bulb 43 may be made to illuminate each of the plates 41 from behind. Each electric bulb 43 is suitably socketed on the wall 39 of each compartment 40. Each electric bulb 43 is connected in circuit with a source of electrical energy through a line 44, switch 45, and line 46, bulb 43, line 47. The switch 45 has a movable contact 52 which is adapted to periodically and sequentially complete and break the circuits of each of the bulbs 43, so that upon each stroke of the iron 4, a bulb 43 will be shut off and subsequent bulb 43 illuminated.

The contact 52 is connected in circuit with the line 44 and is mounted axially upon, and insulated from a shaft 48. The contact 52 has a finger 56. The finger 56 is adapted to contact successively with a plurality of contact arms 53 projecting radially inward from binding posts 54 arranged upon an insulated plate 55. The binding posts are connected to a line 46 of the lamp circuit.

The contact 52 is operated by a ratchet 60 keyed to the shaft 48. The teeth 61 of the ratchet are adapted to be successively engaged by a pawl 62 pivotally supported on a rocker arm 63. The rocker arm 63 is caused to rock by movement of the block 30 which has a projecting portion 66 adapted to engage a freely swinging lever 68 upon each complete reciprocation of the block 30, as shown in Fig. 3 wherein the block 30 is ahead of the link 32 and the clasp 31, and at the end of a complete left to right stroke of the block 30. The lever 68 is connected to the rocker arm by a link 70 and spring 71. Thus it will be observed that as the block 30 approaches the lever 68, the lever will be swung to resiliently rock the arm 63, moving the ratchet and movable contact 52 about the shaft 48 to break the circuit of one lamp bulb and complete the circuit of the next successive lamp bulb. If desired the rocker arm 63 may be provided with a spring 73 to cause quick return of the rocker arm after movement of the contact 52.

In order to provide a constant non-tamperable resistance in the circuit of the motor 20 which consists in line 44, line 75, motor 20, line 76, and line 47, a suitable electric bulb 77 may be located in the line 75.

Thus it will be seen that I have provided an advertising device which may readily simulate an operation involving a use of the article advertised and which provides means for further advertising the article through medium of script.

I claim:

1. In a mechanical movement for an activated advertising device comprising a figurine having a movable portion, a frame for supporting said figurine, an endless belt supported on said frame, means for moving said endless belt, an element pivotally connecting said endless belt to said movable portion, and a guiding edge formed on said frame for directing the movement of said element upon movement of the endless belt to move said movable portion of the figurine.

2. In a mechanical movement for an activated advertising device comprising a figurine have a movable portion, a frame for supporting the figurine, a slot formed in one of the walls of the said frame, an endless belt supported on the frame in substantial alignment with said slot, means for moving said endless belt, and means for pivotally connecting said endless belt and said movable portion, the second named means adapted to extend through the said slot and be reciprocated along the line thereof upon movement of the endless belt.

3. In a mechanical movement for an activated advertising device comprising a figurine having a movable portion, a frame for supporting the figurine, a slot formed in one wall of the frame, a member extending through the slot and adapted to be reciprocated along the line of the slot, an endless belt, means for supporting the belt in substantial alignment with said slot, a link pivotally connected to the endless belt and to the said member and means for moving said belt whereby the said member will be moved in the said slot to move the movable portion of the said figurine.

4. In a mechanical movement for an activated advertising device comprising a figurine having a movable portion, a cabinet, the figurine supported on the cabinet, the cabinet having a slot formed in the wall thereof, a member extending through said slot and adapted to be reciprocated along the line of said slot, the said member pivotally connected to the movable portion of the figurine, an endless belt, a pair of pulleys for supporting the belt, a link pivotally connected to the belt and to the said member, an electric motor, a source of current connected to said electric motor to one of the said pair of pulleys to move the endless belt and consequently reciprocate the said member in the said slot.

5. In a mechanical movement for an activated advertising device comprising a figurine having a movable portion, a cabinet for supporting the figurine, a slot formed in a wall of the cabinet, a member extending through the slot and adapted to be reciprocated along the line of said slot, the member pivotally connected to the movable portion of the figurine, an endless belt, a pair of pulleys for supporting the belt, a link pivotally connected to the endless belt and to the said member, an electric motor, a source of current connected to said electric motor, means for connecting the electric motor to one of the said pair of pulleys for rotating the pulley to move the belt, a translucent plate supported by the cabinet, a lamp bulb supported in light-transmissable relation to the said plate, and an electric switch operable by the said member to connect said bulb with the source of current.

6. In a mechanical movement for an activated advertising device comprising a figurine having a movable portion, a cabinet for supporting the figurine, a slot formed in a wall of the cabinet, a member extending through the slot and adapted to be reciprocated along the line of said slot, the member pivotally connected to the movable portion of the figurine, an endless belt, a pair of pulleys for supporting the belt, a link pivotally connected to the endless belt and to the said member, an electric motor, a source of current connected to said electric motor, means for connecting the electric motor to one of the said pair of pulleys for rotating the pulley to move the belt, the cabinet having a plurality of openings, a translucent plate located over each of said openings, a lamp bulb located on one side of each translucent plate, and an electric switch operable by the movement of said member to connect each lamp bulb with the source of current.

CLAYTON W. HUFF.